(12) United States Patent
Fujikawa et al.

(10) Patent No.: US 12,154,335 B2
(45) Date of Patent: Nov. 26, 2024

(54) IMAGING DEVICE, IMAGING METHOD, AND PROGRAM

(71) Applicant: FUJIFILM Corporation, Tokyo (JP)

(72) Inventors: Tetsuya Fujikawa, Saitama (JP); Yukinori Nishiyama, Saitama (JP); Koichi Tanaka, Saitama (JP); Tetsu Wada, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 890 days.

(21) Appl. No.: 17/183,093

(22) Filed: Feb. 23, 2021

(65) Prior Publication Data

US 2021/0174090 A1  Jun. 10, 2021

Related U.S. Application Data

(63) Continuation of application No. PCT/JP2019/031095, filed on Aug. 7, 2019.

(30) Foreign Application Priority Data

Sep. 26, 2018  (JP) .................. 2018-179970

(51) Int. Cl.
*G06V 20/40* (2022.01)
*G06F 16/78* (2019.01)
*G06F 16/783* (2019.01)

(52) U.S. Cl.
CPC ............ *G06V 20/41* (2022.01); *G06F 16/783* (2019.01); *G06F 16/7867* (2019.01); *G06V 20/44* (2022.01); *G06V 20/46* (2022.01)

(58) Field of Classification Search
CPC .... H04N 23/667; H04N 23/60; H04N 5/2621; H04N 5/772; H04N 5/77; H04N 5/92;
(Continued)

(56) References Cited

U.S. PATENT DOCUMENTS 10,148,879 B2 * 12/2018 Jung .................. H04N 1/00244
2013/0293733 A1 11/2013 Ichikawa
(Continued)

FOREIGN PATENT DOCUMENTS

JP  2007-325152 A  12/2007
JP  2012-248937 A  12/2012
(Continued)

OTHER PUBLICATIONS

International Preliminary Report on Patentability for International Application No. PCT/JP2019/031095, dated Jun. 1, 2020, with English translation.

(Continued)

*Primary Examiner* — Sean T Motsinger
(74) *Attorney, Agent, or Firm* — Birch, Stewart, Kolasch & Birch, LLP

(57) ABSTRACT

An imaging device including an image sensor that captures a video; and a processor configured to extract a first frame from a plurality of frames constituting the video captured by the image sensor to generate a first static image file, generate a video file constituted of a plurality of frames including the first frame from the video, and store the video file, the first static image file, and additional information indicating a position of the first frame in the video file.

20 Claims, 12 Drawing Sheets

(58) Field of Classification Search
CPC .. H04N 9/8205; H04N 9/8047; H04N 9/8042; H04N 1/212; G06T 11/00; G06V 20/41; G06V 20/46; G06V 20/44; G06F 16/783; G06F 16/7867
See application file for complete search history.

(56) References Cited

U.S. PATENT DOCUMENTS

| | | | |
|---|---|---|---|
| 2015/0062376 A1* | 3/2015 | Ohnishi | H04N 5/77 348/231.2 |
| 2017/0237936 A1* | 8/2017 | Ohnishi | H04N 1/2129 386/225 |
| 2021/0174090 A1* | 6/2021 | Fujikawa | H04N 5/77 |

FOREIGN PATENT DOCUMENTS

| | | |
|---|---|---|
| JP | 2016-167855 A | 9/2016 |
| JP | 2017-147656 A | 8/2017 |

OTHER PUBLICATIONS

International Search Report for International Application No. PCT/JP2019/031095, dated Oct. 29, 2019, with English translation.

* cited by examiner

IMAGING DEVICE, IMAGING METHOD, AND PROGRAM

CROSS-REFERENCE TO RELATED APPLICATIONS

This application is a Continuation of PCT International Application No. PCT/JP2019/031095 filed on Aug. 7, 2019, which claims priority under 35 U.S.C § 119(a) to Japanese Patent Application No. 2018-179970 filed on Sep. 26, 2018. Each of the above application(s) is hereby expressly incorporated by reference, in its entirety, into the present application.

BACKGROUND OF THE INVENTION

1. Field of the Invention

The present invention relates to an imaging device, an imaging method, and a program that image a video, and particularly to an imaging device, an imaging method, and a program that extract a frame constituting a video as a static image.

2. Description of the Related Art

There is known a technique of extracting a frame constituting a video as a static image. For example, JP2016-167855A describes that marking is performed on a video at a static image acquisition timing in response to a user's instruction during imaging of the video and a marking point and frames before and after the marking point are extracted from the video and displayed after the video capturing ends, so that the user can select a timing for extracting the static image from the video to extract a video frame at the timing as a static image.

SUMMARY OF THE INVENTION

The present invention has been made in view of such circumstances, and an object thereof is to provide an imaging device, an imaging method, and a program capable of easily extracting a static image from a video.

In order to achieve the object described above, an imaging device according to a first aspect of the present invention includes a video capturing section that captures a video, a static image file generation section that extracts a first frame from a plurality of frames constituting the video captured by the video capturing section to generate a first static image file, a video file generation section that generates a video file constituted of a plurality of frames including the first frame from the video, and a storage section that stores the video file, the first static image file, and additional information indicating a position of the first frame in the video file.

According to the first aspect, the static image file (first static image file) and the additional information are stored in addition to the video file. Therefore, it is not essential to separately extract the static image. Decoding (static image processing) is not always performed on every extraction. Therefore, it is possible to reduce a load on the imaging device by a reduced frequency of the decoding. In a case where the static image is extracted, it is possible to easily specify a position of the static image file in the video based on the additional information. Accordingly, it is possible to easily extract the static image from the video in the first aspect. In the first aspect and each of the following aspects, it is preferable to perform the storing processing of the first static image file and the additional information in parallel with the processing (imaging, storing) of the video file. The video file to be stored may be a file (partial video file) of a part of the imaged video, and it is possible to reduce a storing capacity by adjusting a storing time.

In the first aspect and each of the following aspects, the "additional information indicating the position of the first frame in the video file" may be information that can specify the first frame among the plurality of frames constituting the video file, such as a first frame number with reference to a head frame and an elapsed time from the start of storing the video to the acquisition of the first frame. The additional information may be stored in the video file and/or the static image file, or may be stored separately from the files.

In the imaging device according to a second aspect, according to the first aspect, the additional information includes information that indicates a relationship between the video file and the first static image file and is used for specifying one of the first static image file and the video file and specifying the other by referring to the information. According to the second aspect, the first static image file and the video file can be referred to each other. Therefore, it is possible to specify the video from the static image based on the additional information even though the video from which the static image is desired to be extracted (extraction source video) cannot be specified.

In the imaging device according to a third aspect, according to the first or second aspect, the additional information further includes a file name of the video file and a file name of the first static image file. According to the third aspect, it is possible to easily grasp a correspondence relationship between the video file and the first static image file. The video file and the first static image file may have the same file name (in this case, the file can be identified by changing filename extensions).

In the imaging device according to a fourth aspect, according to any one of the first to third aspects, the storage section stores the additional information in the video file. The additional information can be stored in a header or a footer of the video file, for example.

In the imaging device according to a fifth aspect, according to any one of the first to fourth aspects, the storage section stores the additional information in the first static image file. The additional information can be stored in a header or a footer of the first static image file, for example.

In the imaging device according to a sixth aspect, according to any one of the first to fifth aspects, the storage section stores the first static image file and the video file in the same folder. According to the sixth aspect, the correspondence relationship between the first static image file and the video file is clear. Therefore, it is easy to perform the file management.

In the imaging device according to a seventh aspect, according to any one of the first to sixth aspects, a video file designation section that designates the video file, and a display control section that causes a display device to display image data of the first static image file with reference to the additional information in a case where the video file is designated are further provided. Accordingly, the user can visually recognize the stored static image (the image corresponding to the first static image file).

In the imaging device according to an eighth aspect, according to the seventh aspect, the display control section superimposes and displays information indicating that the first static image file is extracted from the plurality of frames constituting the video file on the image data. According to the eighth aspect, the user can easily identify that the first static image file is extracted from the plurality of frames constituting the video file with the superimposed display.

In the imaging device according to a ninth aspect, according to the seventh or eighth aspect, an image selection section that receives an operation of selecting a reference image from at least one or more pieces of displayed image data of the first static image file, and a static image extraction section that extracts a second frame from the plurality of frames constituting the video file to generate a second static image file based on the selected reference image are further provided. The frame of the reference image and the second static image file may have the same timing or different timings.

In the imaging device according to a tenth aspect, according to the ninth aspect, the display control section causes the display device to display image data of frames stored in a time range including a frame of the reference image from the plurality of frames constituting the video file. The image selection section receives an operation of selecting static image extracting image data from the displayed image data. The static image extraction section extracts a frame corresponding to the selected static image extracting image data among the plurality of frames as the second frame to generate the second static image file. An imaging timing of the static image that the user wants to extract may be shifted from an imaging timing of the reference image. However, according to the tenth aspect, the user can extract the frame at a desired timing (second frame) as the static image (second static image file).

In the imaging device according to an eleventh aspect, according to the ninth or tenth aspect, the image data of the first static image file has a higher image quality than image data of the plurality of frames constituting the video file. The static image extraction section uses the first static image file to generate the second static image file in a case where a difference between a time at which the second frame is stored and a time at which the first frame is stored is equal to or less than a threshold value. The static image stored during the video capturing is not subjected to video compression and may be subjected to image processing for the static image. Therefore, the static image has higher image quality than that of each frame after the video compression. Therefore, with the use of such a high-quality static image (first static image file), it is possible to generate the high-quality second static image file. The image quality of the second static image file may deteriorate in a case where the difference in the storing time (storing timing) is large. Therefore, it is preferable to set the threshold value according to required image quality. Examples of "high image quality" include high resolution and a low compression ratio (zero, that is, non-compression may be used), but are not limited to the examples. The image data of the static image file may be RAW data.

In the imaging device according to a twelfth aspect, according to any one of the ninth to eleventh aspects, the static image extraction section adds a difference between image data of the first frame and the second frame of the video file to the image data of the first static image file to generate the second static image file. The twelfth aspect defines an example of the generation method of the second static image file.

In the imaging device according to a thirteenth aspect, according to any one of the first to sixth aspects, a static image file designation section that designates the first static image file, and a display control section that causes a display device to display image data of a plurality of frames constituting the video file with reference to the additional information in a case where the first static image file is designated are further provided. According to the thirteenth aspect, the user can visually recognize the plurality of frames including the first frame.

In the imaging device according to a fourteenth aspect, according to the thirteenth aspects, an image selection section that receives an operation of selecting one or more pieces of image data from the displayed image data, and a static image extraction section that extracts a frame of the video file corresponding to the image data selected by the image selection section, to generate a static image file are further provided. According to the fourteenth aspect, it is possible to generate the static image file corresponding to the selected image data (image data desired by the user).

In the imaging device according to a fifteenth aspect, according to any one of the first to fourteenth aspects, the static image file generation section stores the first static image file in response to an input from an instruction input section that receives an instruction from an outside. The static image file generation section can store the first static image file by determining that "instruction from the outside is input" in a case where there is a user operation such as the press of a release button.

In the imaging device according to a sixteenth aspect, according to any one of the first to fifteenth aspects, an event detection section that detects a frame in which an event occurs from the plurality of frames constituting the video is further provided. The static image file generation section generates the first static image file according to the detection. In the sixteenth aspect, the first static image file is generated according to the detection of the event. Therefore, it is suitable for long-time imaging or unmanned imaging.

In the imaging device according to a seventeenth aspect, according to any one of the first to sixteenth aspects, the static image file generation section processes the first static image file by circuitry that is at least partially independent of the video file. According to the seventeenth aspect, the first static image file and the video file are processed by at least partially independent circuitry. Therefore, it is possible to reduce a load due to simultaneous processing can be reduced.

In order to achieve the object described above, an imaging method according to an eighteenth aspect of the present invention includes a video capturing step of capturing a video, a static image file generation step of extracting a first frame from a plurality of frames constituting the video captured in the video capturing step to generate a first static image file, a video file generation step of generating a video file constituted of a plurality of frames including the first frame from the video, and a storing step of storing the video file, the first static image file, and additional information indicating a position of the first frame in the video file. According to the eighteenth aspect, it is possible to easily extract the static image from the video as in the first aspect.

In the imaging method according to a nineteenth aspect, according to the eighteenth aspect, the additional information includes information that indicates a relationship between the video file and the first static image file and is used for specifying one of the first static image file and the video file and specifying the other by referring to the information. According to the nineteenth aspect, the first static image file and the video file can be referred to each other by the additional information.

In the imaging method according to a twentieth aspect, according to the eighteenth or nineteenth aspect, in the storing step, the additional information is stored in the video file. The additional information can be stored in a header or a footer of the video file, for example.

In the imaging method according to a twenty-first aspect, according to any one of the eighteenth to twentieth aspects, in the storing step, the additional information is stored in the first static image file. The additional information can be stored in a header or a footer of the first static image file, for example.

In the imaging method according to a twenty-second aspect, according to any one of the eighteenth to twenty-first aspects, a video file designation step of designating the video file and a display control step of causing a display device to display image data of the first static image file with reference to the additional information in a case where the video file is designated are further provided. According to the twenty-second aspect, the user can visually recognize the stored static image (the image corresponding to the first static image file) as in the seventh aspect.

In the imaging method according to a twenty-third aspect, according to the twenty-second aspect, in the display control step, information indicating that the first static image file is extracted from the plurality of frames constituting the video file is superimposed and displayed on the image data. According to the twenty-third aspect, it is possible to easily identify that the first static image file is extracted from the plurality of frames constituting the video file with the superimposed display.

In the imaging method according to a twenty-fourth aspect, according to any one of the eighteenth to twenty-first aspects, a static image file designation step of designating the first static image file, and a display control step of causing a display device to display image data of a plurality of frames constituting the video file with reference to the additional information in a case where the first static image file is designated are further provided. According to the twenty-fourth aspect, the user can visually recognize the plurality of frames including the first frame as in the thirteenth aspect.

In the imaging method according to a twenty-fifth aspect, according to the twenty-fourth aspect, an image selection step of receiving an operation of selecting one or more pieces of image data from the displayed image data, and a static image extraction step of extracting a frame of the video file corresponding to the image data selected in the image selection step to generate a static image file are further provided. According to the twenty-fifth aspect, it is possible to generate the static image file corresponding to the selected image data as in the fourteenth aspect.

In order to achieve the object described above, a program according to a twenty-sixth aspect of the present invention causes a computer to execute the imaging method according to any one of the eighteenth to twenty-fifth aspects. A non-transitory recording medium recording a computer readable code of the program of the aspects can also be mentioned as an aspect of the present invention. The "computer" can be constituted of circuitry such as various processors in devices such as an imaging device and an image processing device.

As described above, according to the imaging device, the imaging method, and the program according to the present invention, it is possible to easily extract the static image from the video.

DESCRIPTION OF THE PREFERRED EMBODIMENTS

Hereinafter, embodiments for implementing an imaging device, an imaging method, and a program according to the present invention will be described in detail with reference to accompanying drawings.

First Embodiment

<Overall Configuration of Imaging Device>

Figure 1:
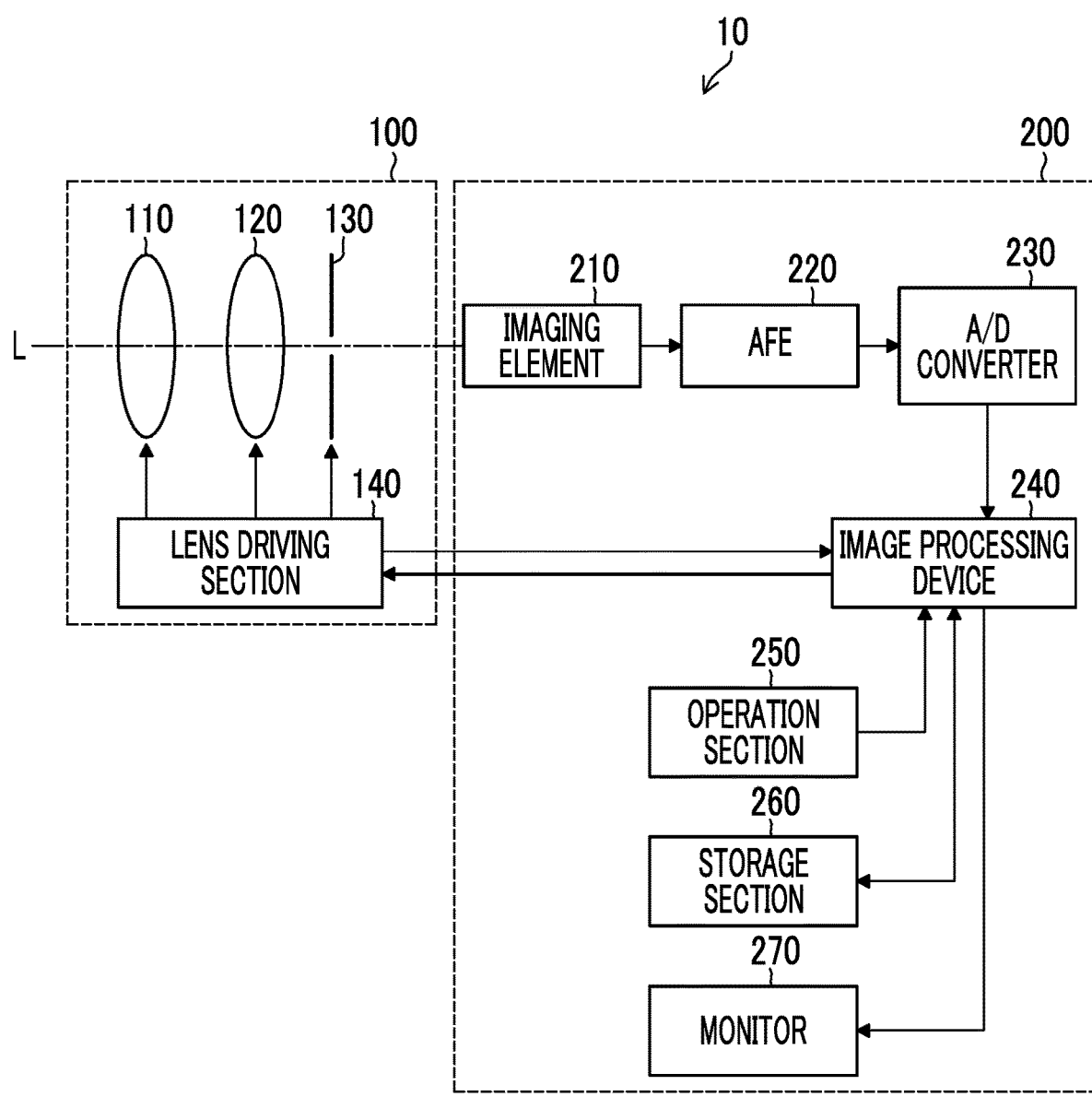
FIG. 1 is a diagram showing a configuration of a camera system according to a first embodiment.

FIG. 1 is a diagram showing a configuration of a camera system 10 (imaging device) according to a first embodiment. The camera system 10 is constituted of an interchangeable lens 100 (imaging section and imaging device) and an imaging device body 200 (imaging device), and forms a subject image (optical image) on an imaging element 210 with an imaging lens including a zoom lens 110 described below. The interchangeable lens 100 and the imaging device body 200 can be attached and detached through a mount (not shown).

<Configuration of Interchangeable Lens>

The interchangeable lens 100 comprises a zoom lens 110, a focus lens 120, a stop 130, and a lens driving section 140. The lens driving section 140 drives the zoom lens 110 and the focus lens 120 forward and backward according to a command from an image processing device 240 (lens driving control section 240K in FIG. 2) to perform zoom (optical zoom) adjustment and focus adjustment. The zoom adjustment and the focus adjustment may be performed according to a zoom operation and a focus operation (moving rotationally with a zoom ring and a focus ring (not shown) or the like) performed by a user, in addition to the command from the image processing device 240. The lens driving section 140 controls the stop 130 according to the command from the image processing device 240 to adjust exposure. On the other hand, information such as positions of the zoom lens 110 and the focus lens 120 and an opening degree of the stop 130 is input to the image processing device 240. The interchangeable lens 100 has an optical axis L.

<Configuration of Imaging Device Body>

The imaging device body 200 comprises the imaging element 210 (imaging section, video capturing section), an AFE 220 (analog front end: AFE, imaging section, video capturing section), an A/D converter 230 (analog to digital: A/D, imaging section, video capturing section), and the image processing device 240. The imaging device body 200 may have a shutter (not shown) for blocking light transmitted through the imaging element 210. The imaging element 210 comprises a light receiving surface in which a large number of light receiving elements are arranged in a matrix. Subject light transmitted through the zoom lens 110, the focus lens 120, and the stop 130 is image-formed on the light receiving surface of the imaging element 210 and is converted into an electric signal by each light receiving element. A color filter of R (red), G (green), or B (blue) is provided on the light receiving surface of the imaging element 210, and a color image of a subject can be acquired based on a signal of each color. Various photoelectric conversion elements such as a complementary metal-oxide semiconductor (CMOS) and a charge-coupled device (CCD) can be used as the imaging element 210. The AFE 220 performs noise removal, amplification, and the like of an analog image signal output from the imaging element 210, and the A/D converter 230 converts the captured analog image signal into a digital image signal with a gradation width.

<Configuration of Image Processing Device>

Figure 2:
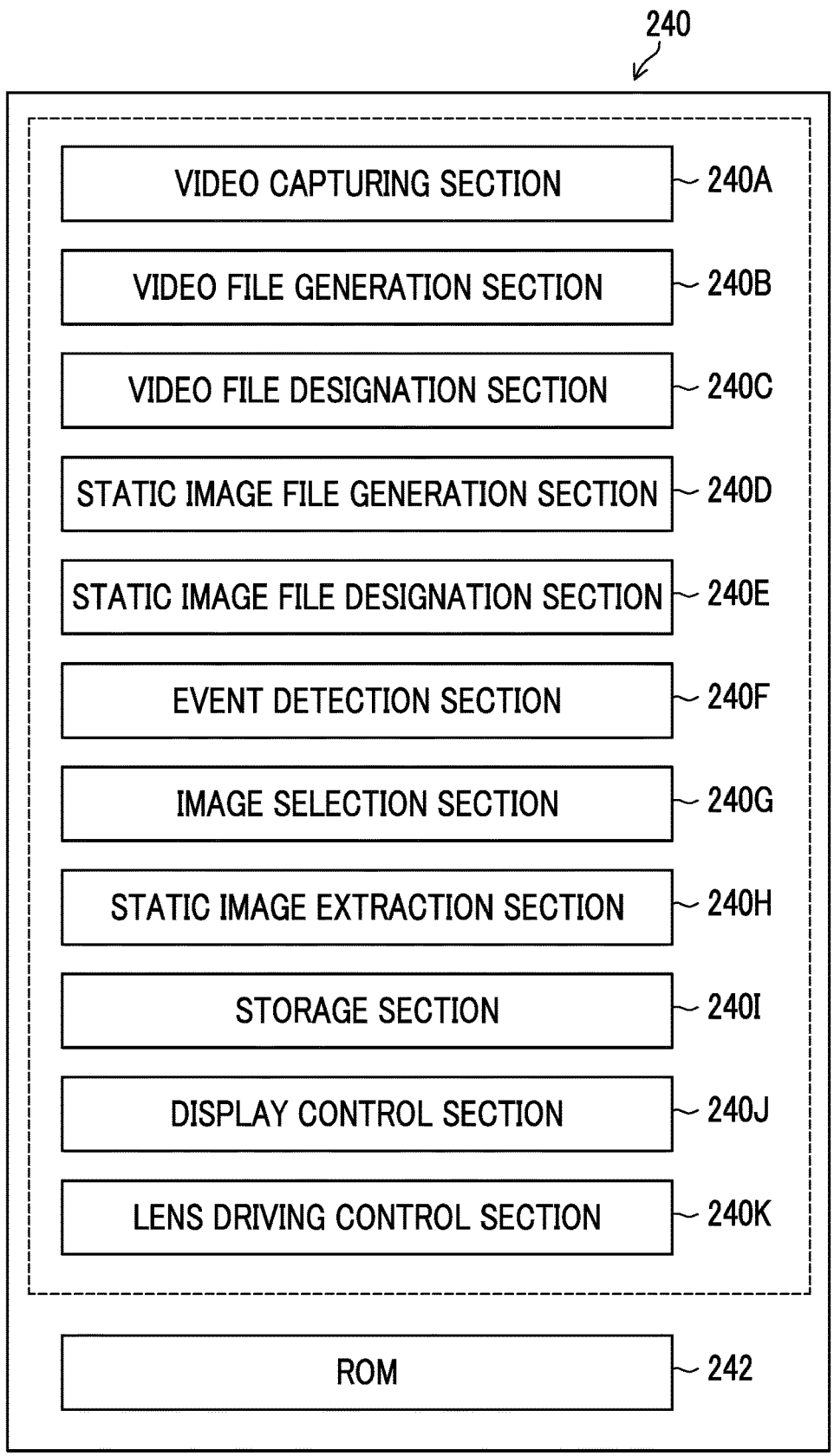
FIG. 2 is a diagram showing a functional configuration of an image processing device.

FIG. 2 is a diagram showing a functional configuration of the image processing device 240. The image processing device 240 comprises a video capturing section 240A (video capturing section), a video file generation section 240B (video file generation section), a video file designation section 240C (video file designation section), a static image file generation section 240D (static image file generation section), a static image file designation section 240E (static image file designation section), an event detection section 240F (event detection section), an image selection section 240G (image selection section), a static image extraction section 240H (static image extraction section), a storage section 240I (storage section), a display control section 240J (display control section), and a lens driving control section 240K (lens driving control section). The image processing device 240 performs processing such as imaging and file generation of a video, static image file generation, processing for a plurality of frames constituting a video, and extraction of a static image, based on the digital image signal input from the A/D converter 230. The processing by the image processing device 240 will be described below in detail.

Functions of the image processing device 240 can be realized by using various processors. The various processors include, for example, a central processing unit (CPU), which is a general-purpose processor that executes software (program) to realize various functions. The various processors described above also include a graphics processing unit (GPU) which is a processor specialized in image processing and a programmable logic device (PLD) which is a processor whose circuit configuration can be changed after manufacturing such as a field programmable gate array (FPGA). Further, the various processors described above also include a dedicated circuitry, which is a processor having a circuit configuration specifically designed to execute specific processing such as an application specific integrated circuit (ASIC), and the like.

The function of each section may be realized by one processor, or a plurality of processors of the same type or different types (for example, a plurality of FPGAs, a combination of CPU and FPGA, or a combination of CPU and GPU). A plurality of functions may be realized by one processor. As an example of configuring the plurality of functions by one processor, firstly, there is a form in which one processor is constituted of a combination of one or more CPUs and software and the processor realizes the plurality of functions, as represented by a computer such as an image processing device body or a server. Secondly, there is a form in which a processor that realizes functions of the entire system by one integrated circuit (IC) chip is used, as represented by a system on chip (SoC). As described above, a hardware structure for the various functions is constituted of using one or more of the various processors described above. Further, the hardware structure of the various processors is, more specifically, circuitry in which circuit elements such as semiconductor elements are combined. The circuitry may be circuitry that realize the functions described above by using logical sum, logical product, logical negation, exclusive logical sum, and logical operation combining the above.

It is preferable that the video file generation section 240B and the static image file generation section 240D are constituted of at least partially independent circuitry and at least a part of generation processing of a static image file (first static image file) is performed independently of generation processing of the video file. This can reduce a processing load (described below).

In a case where the above processor or circuitry executes the software (program), a processor (computer) readable code of the executing software is stored in a non-transitory recording medium such as a read only memory (ROM) and the processor refers to the software. The software stored in the non-transitory recording medium includes a program for executing the imaging method according to the present invention. The code may be recorded in various magneto-optical storages and a non-transitory recording medium such as a semiconductor memory instead of the ROM. In a case where processing using the software is performed, for example, a random access memory (RAM) may be used as a transitory storage region or data stored in an electronically erasable and programmable read only memory (EEPROM) (not shown) may be referred to.

The image processing device 240 comprises a ROM 242 (read only memory: ROM, non-transitory recording medium) in addition to each section described above. The ROM 242 can record computer readable codes of programs (including the program for executing the imaging method according to the present invention) necessary for imaging, recording, display, and the like of an image.

<Operation Section>

The operation section 250 (instruction input section) has a release button, an operation button (for example, a cross button, a Quick button, an OK button, or the like), a dial, a switch, and the like (not shown), and the user can perform various operations such as an imaging mode setting, a video capturing instruction, and a static image extraction instruction. A monitor 270 (touch panel type) may be used as the operation section 250.

<Storage Device>

A storage device 260 (storage device, storage section) is constituted of various magneto-optical recording media, a non-transitory recording medium such as a semiconductor memory, and a control circuit thereof, and stores the video, the static image, the static image extracted from the video, and the like. A recording medium type capable of being attached to and detached from the imaging device body 200 can be used.

<Monitor and View Finder>

The monitor 270 (display device) is constituted of a touch panel type liquid crystal display panel and can display the video, the static image, an imaging condition, additional information, and the like. The monitor 270 can be disposed on a back surface side, a top surface side, or the like of the imaging device body 200. The camera system 10 may comprise a view finder. The view finder is constituted of, for example, a liquid crystal display panel, a prism, a lens, and the like, and the user can visually recognize the video, the static image, the imaging condition, the additional information, and the like through an eyepiece section (not shown). An "optical view finder (OVF)", an "electronic view finder (EVF)", or a "hybrid view finder (HVF)" which is a combination of these can be used as the view finder.

<Imaging Mode of Camera System>

The camera system 10 can set any one of a static image imaging mode, a normal video capturing mode (first video capturing mode), or a static image extracting video capturing mode (second video capturing mode) as an imaging mode. The static image imaging mode and the normal video capturing mode are the same as those of a normal digital camera. In the static image extracting video capturing mode, a video having a different capturing condition from the normal video capturing mode (video having an imaging condition emphasizing the extraction of the static image rather than viewing the video itself) is imaged. Specifically, in the static image extracting video capturing mode, at least one of a shutter speed, a speed of autofocus, a tracking speed of automatic exposure, or a tracking speed of white balance is set faster than that of the normal video capturing mode and/or a frame rate is set higher than that of the normal video capturing mode. Resolution and the frame rate are set to the highest values (for example, 4,000×2,000 pixels, 30 frames/second) that can be set by the camera system 10, and a tone is also set on an assumption of the static image extraction. An upper limit of ISO sensitivity is also set higher than that of the normal video capturing mode.

For example, the shutter speed is set to a value corresponding to a frame rate of a video to be recorded in the normal video capturing mode (1/30 seconds in a case where the frame rate is 30 frames/second), but is set faster (for example, less than 1/30 seconds) than a frame interval in a static image extracting video mode. In the normal video capturing mode, the shutter speed is set to the value corresponding to the frame rate of the video such that a smooth video is played back. However, a moving subject may be blurred in this case. Therefore, the shutter speed is set higher than that of the normal video capturing mode (higher than the frame interval) in the static image extracting video capturing mode, and thus it is possible to extract a high-quality static image with less blurring of the subject. Similarly, it is possible to increase the shutter speed by increasing the upper limit of ISO sensitivity, and thus it is possible to extract a static image with less blurring. It is possible to acquire many frames focused on the subject, many frames with appropriate exposure, and the like by setting the speed of autofocus, the tracking speed of automatic exposure, the tracking speed of auto white balance, or the like faster than that of the normal video capturing mode. The frame interval of the video is shorter by setting the frame rate to the high rate, and thus the number of frames that can be extracted as the static image increases.

With the static image extracting video capturing mode described above, it is possible to store the video and extract the frame constituting the video as the static image. Therefore, the user can easily image a photograph of an event (natural phenomenon, accident, happening, or the like) that does not know when it occurs, a photograph of a momentary state of a subject whose state changes with the passage of time or a moving subject, and the like. In this case, it is possible to extract the static image not only at the timing at which the recording of the static image is instructed but also at another timing as described below in detail. Therefore, the user can acquire the static image at a desired timing. With the setting of the imaging conditions (shutter speed, resolution, frame rate, and the like described above) suitable for the static image extraction, it is possible to extract a high-quality static image.

<Processing in Static Image Extracting Video Capturing Mode>

Figure 3:
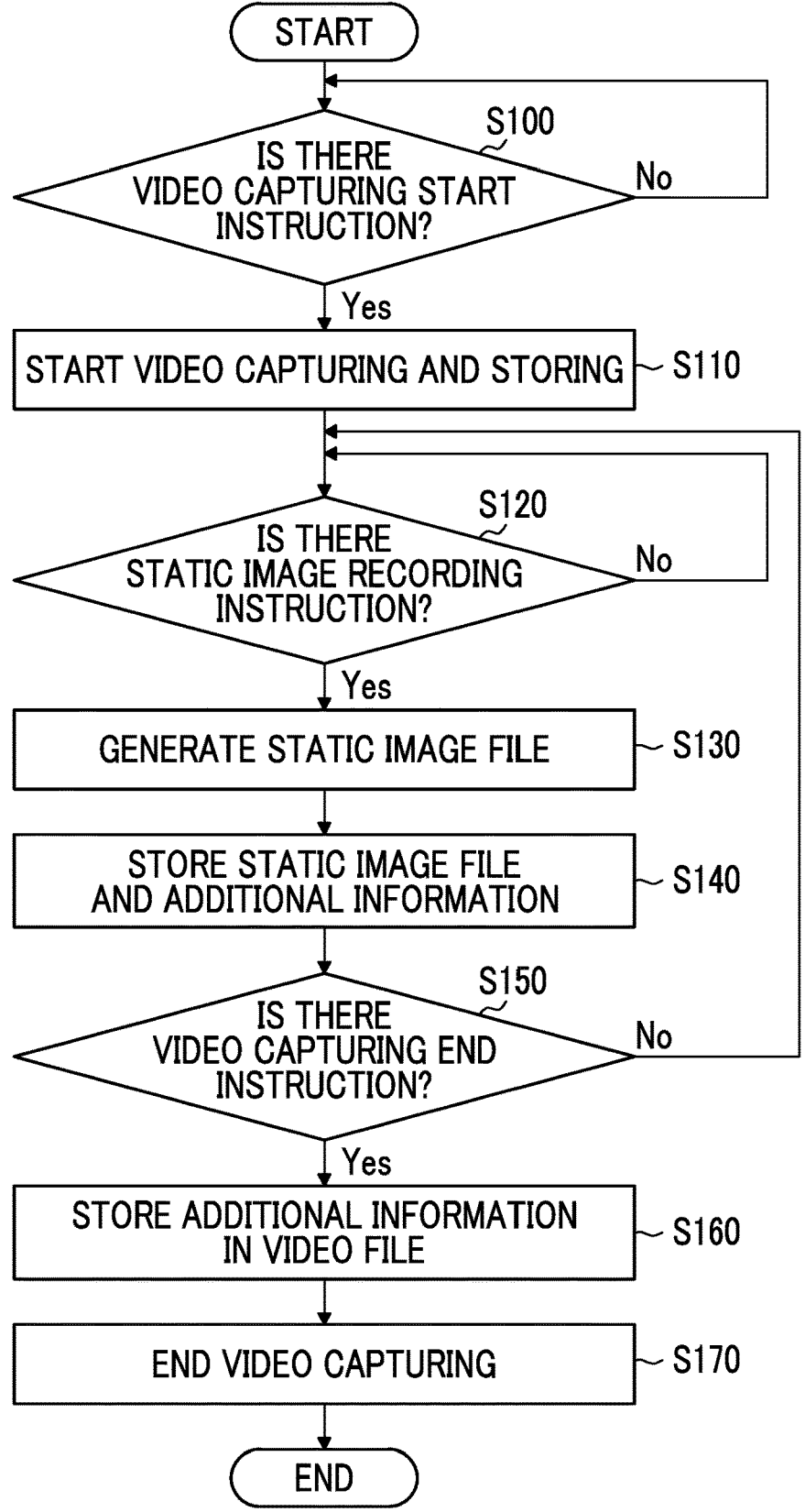
FIG. 3 is a flowchart showing recording processing of a video and a static image.

The imaging method in the camera system 10 having the above configuration will be described. FIG. 3 is a flowchart showing processing in the static image extracting video capturing mode. For example, in a case where the camera system 10 is set to the static image extracting video capturing mode by operating a mode dial (not shown) of the operation section 250, the processing of FIG. 3 is started.

<Video Recording Instruction>

Figure 4:
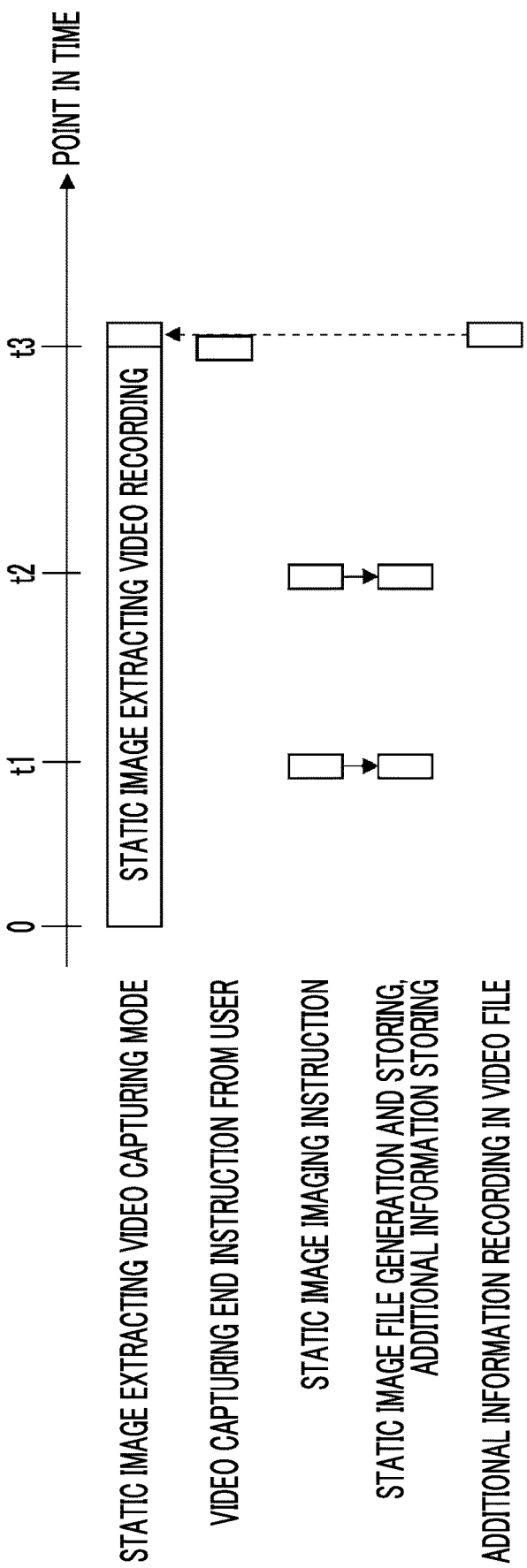
FIG. 4 is a diagram showing a state where the video and the static image are recorded.

The video capturing section 240A (video capturing section) determines whether or not the video capturing instruction is issued (Step S100: video capturing step, video file generation step). For example, in a case where the release button (not shown) of the operation section 250 is pressed down, it can be determined that "video capturing instruction is issued". In a case where the determination is affirmative, the processing proceeds to Step S110. In the example of FIG. 4, it is assumed that imaging is performed in the static image extracting video capturing mode from point in time 0 to point in time t3.

<Imaging and Compression Recording of Video>

In Step S110, the video capturing section 240A starts the imaging of the video (video capturing step), the video file generation section 240B (video file generation section) compresses the imaged video to generate a new video file (video file generation step), and the storage section 240I (storage section) starts the storing of the generated video file in the storage device 260 (storage device) (storing step). The recording and the storing may be performed together with a voice by a microphone (not shown) provided in the camera system 10. The video can be compressed in an MPEG format (MPEG2, MPEG4, or the like). In this case, the frame of the video is divided into an I-frame, a P-frame, and a B-frame. A group of pictures (GOP) is formed by at least the I-frame among the frames. The I-frame is a frame that holds all information of the frame, and the P-frame is a frame that can express only a difference unless a preceding I-frame is referred to. The B-frame is a frame that can express only a difference unless preceding and following I-frame, P-frame, and B-frame are referred to.

<Static Image Generation Instruction>

The static image file generation section 240D (static image file generation section) determines whether or not a static image recording instruction (static image file generation instruction) is issued (Step S120: static image file generation step). The determination of the static image recording instruction can be made on a GOP unit in response to an instruction input from the outside (user's instruction, or the like) or according to the detection of the event. In a case where the determination is made in the GOP unit, it can be determined that "static image recording instruction is issued" every time a new GOP is recorded, for example. In a case where the determination is made according to the input of the instruction from the outside, it can be determined that the "static image recording instruction is issued" in the case where the release button (not shown) of the operation section 250 is pressed or in a case where an operation through the monitor 270 is performed, for example. In a case where determination is made according to the event detection, it can be determined that "static image recording instruction is issued" in a case where the event detection section 240F (event detection section) detects a specific subject such as a face of a person from the frame constituting the video or in a case where a movement or brightness change of the subject is detected. A movement of the camera system 10 may be detected by a gyro or an acceleration sensor, and occurrence of an event (and the static image recording instruction according to the event detection) may be determined based on the detection result. In a case where the static image recording instruction is issued (In a case where the determination in Step S120 is affirmative; points in time t1 and t2 in FIG. 4), the static image file generation section 240D extracts a static image frame (first frame) from the plurality of frames constituting the video captured by the video capturing section 240A to generate the first static image file (Step S130: static image file generation step).

In a case where the static image generation instruction is determined in the GOP unit, the high-quality static image can be acquired periodically. Therefore, it is the best option from a viewpoint of image quality in a case where a capacity of the recording medium or an increase in power consumption due to static image processing is acceptable. In the case where the determination is made according to the user's instruction, the static image is recorded according to the user intention. Therefore, the user can easily search the image in the case of the static image extraction and the like. With the determination in the GOP unit only in a specific case (for example, in a case where the release button is continuously pressed), it is possible to minimize the influence on the capacity or the increase in the power consumption. In a case where determination is made according to the event detection, the static image can be automatically generated, which is suitable for long-time imaging or unattended imaging.

<Generation of High-Quality Static Image>

In Step S130, it is preferable that the static image file generation section 240D generates a static image file having the high-quality static image compared with the frame constituting the video. Examples of the "high-quality static image" include an image with a high resolution and an image with a lower compression ratio than the video (zero may be used), but are not limited to the examples. The static image file generation section 240D may generate the static image file in a RAW image format. The "RAW image" is an image in which the data output from the imaging element is digitally converted and recorded in a raw and uncompressed (or lossless compressed) state. It is not necessary to perform filter processing required for color interpolation or enhancement, and a recording cycle is long. Therefore, the influence on video processing by the recording of the RAW image is small. The RAW image may be recorded for each GOP (for example, at a start of the GOP). The static image file generation section 240D may simultaneously generate a low-quality static image (JPEG or the like) compared with the RAW image for the purpose of simply displaying the RAW image, in a case where the static image file is generated in the RAW image format.

With the generation of the "high-quality static image" such as the RAW image in Step S130, it is possible to improve the image quality of the video or the static image extracted from the video, as will be described in detail below.

<Recording of Static Image File and Additional Information>

The storage section 240I (storage section) stores the static image file (first static image file) in the storage device 260 (Step S140: storing step, points in time t1 and t2 in FIG. 4). In Step S140, the additional information indicating a position of the first frame in the video file is stored in the static image file. The additional information can be stored in a header or a footer of the static image file. The "additional information" is information indicating the position of the static image frame (first frame) in the video file. The additional information may be information that can specify the first frame among the plurality of frames constituting the video file, such as a first frame number with reference to a head frame and an elapsed time from the start of storing the video to the acquisition of the first frame. The additional information may include information that indicates a relationship between the video file and the first static image file and is used for specifying one of the first static image file and the video file and specifying the other by referring to the information. The additional information may include, for example, information in which a file name of the video file and a file name of the static image file are respectively assigned to one column and another column of a table.

In a case where the video file, the static image file, and the additional information are stored, the video file may be stored with an assigned file name including a continuous number indicating a time-series order (for example, (imaging date+continuous number)), and the static image file may have the same file name as the video file and a filename extension thereof may be changed (for example, ".mpg" and ".raw"). The video file and the static image file (first static image file) stored during imaging of the video may be stored in the same folder.

In the first embodiment, the static image file (first static image file) is stored in addition to the video file in this manner. Therefore, it is not essential to separately extract the static image. The decoding (static image processing) is not always performed on every extraction. Therefore, it is possible to reduce the load on the imaging device by a reduced frequency of the decoding. In a case where the static image is extracted from the video, it is possible to easily specify the position of the static image file in the video based on the additional information.

<Storing of Additional Information and Ending of Video Capturing>

The video capturing section 240A, the video file generation section 240B, the static image file generation section 240D, and the storage section 240I (and also the event detection section 240F in a case where the static image recording instruction is issued according to the event detection) repeat the processing from Step S120 to Step S140 until there is a video capturing end instruction (YES in Step S150). For example, the determination in Step S150 can be affirmed in the case where the release button (not shown) of the operation section 250 is pressed. In a case where the determination in Step S150 is affirmative, the storage section 240I stores the additional information in the video file (Step S160: storing step). In the example of FIG. 4, it is point in time t3. Even though the additional information is stored at the end of imaging, it is not always necessary to store the additional information at the end of the video file. The additional information may be stored in the header or footer of the video file. After the additional information is stored, the video capturing section 240A, the video file generation section 240B, and the storage section 240I end the video capturing and the video file generation and storing (Step S170).

<Processing in Case of Dividing Video>

In the static image extracting video capturing mode, the video file generation section 240B may divide the video and save each divided video as a different video file. The division may be divided at a constant time interval (for example, every 2 minutes), divided by the GOP unit, divided at a time interval set by the user, divided according to the static image generation instruction from the user, or automatically divided according to the event detection. In a case where the video is divided and saved, it is preferable that the video file including the first frame in the video file to be divided and the static image file (first static image file) can be referred to by the additional information. In this case, the additional information may be, for example, "elapsed time from the start of storing the video" and "information that specifies the relationship between the video file including the first frame in the divided video and the static image file". The additional information may be information that specifies the relationship between the video file including the first frame and the static image file, such as "elapsed time from the start of storing the video file including the first frame in the divided video (or information that specifies the frame position of the first frame in the video file including the first frame)". In the case where the video is divided and saved, the video file including the first frame in the divided video, the static image file (first static image file), and a video file in which the static image file is not stored may be saved in different folders. In a case where a plurality of static image files (a plurality of first static image files) are generated, it is preferable that each static image file and a video file including each frame (first frame) corresponding to each static image file can be referred to by the additional information.

<Frame Replacement Processing>

In a case where the static image file having the high-quality static image file such as the RAW image is recorded in Step S140, the video file generation section 240B may perform static image processing (so-called "development processing" or the like) on the image data of the static image file to convert the image data into image data in the same format as the I-frame (static image conversion step) and replace the converted image data with the corresponding I-frame of the GOP (first replacement step). The video file generation section 240B can perform the replacement based on the additional information described above.

With the processing described above, it is possible to improve the image quality of an I-frame portion of the video by the replacement of the I-frame. In a case where the subject is in focus and moves little, it is possible to improve the image quality of a P-frame portion and a B-frame portion through the I-frame. The display control section 240J can perform a playback display of the video in a state where the replacement is executed on the monitor 270 (display device), and thus the user can view the video with high image quality.

<Another Aspect of Frame Replacement Processing>

The video file generation section 240B calculates a difference between the I-frame before the replacement and the I-frame after the replacement (difference calculation step) and adds the calculated difference to the P-frame and/or the B-frame constituting the GOP (depending on configuration of GOP) (difference addition step). According to such an aspect, it is possible to reduce a correction error caused by a difference in resolution between the high-quality static image (the image recorded in Step S140 and converted into the I-frame for replacement) and the I-frame before the replacement, based on a difference in a moving part for the subject having a slight movement.

The video file generation section 240B can calculate movement information (for example, movement vector) of the P-frame and/or the B-frame (movement information calculation step) and process the I-frame after the replacement based on the movement information to generate the P-frame and/or the B-frame (image generation step). For example, in a case where determination is made based on the calculated movement information (movement vector) that "a plurality of adjacent macroblocks move in the same or almost the same direction (movement vectors are the same or almost the same)", the video file generation section 240B extracts the subject from the I-frame after the replacement (frame corresponding to the high-quality static image), and moves, enlarges or reduces, modifies, or the like the subject in accordance with the movement vector. According to such an aspect, in a case where the movement of the subject is large, it is possible to improve the image quality of moving P-frame and/or B-frame with the process of the I-frame whose image quality is improved by the replacement.

<Parallel Processing of Video and Static Image>

Figure 5:
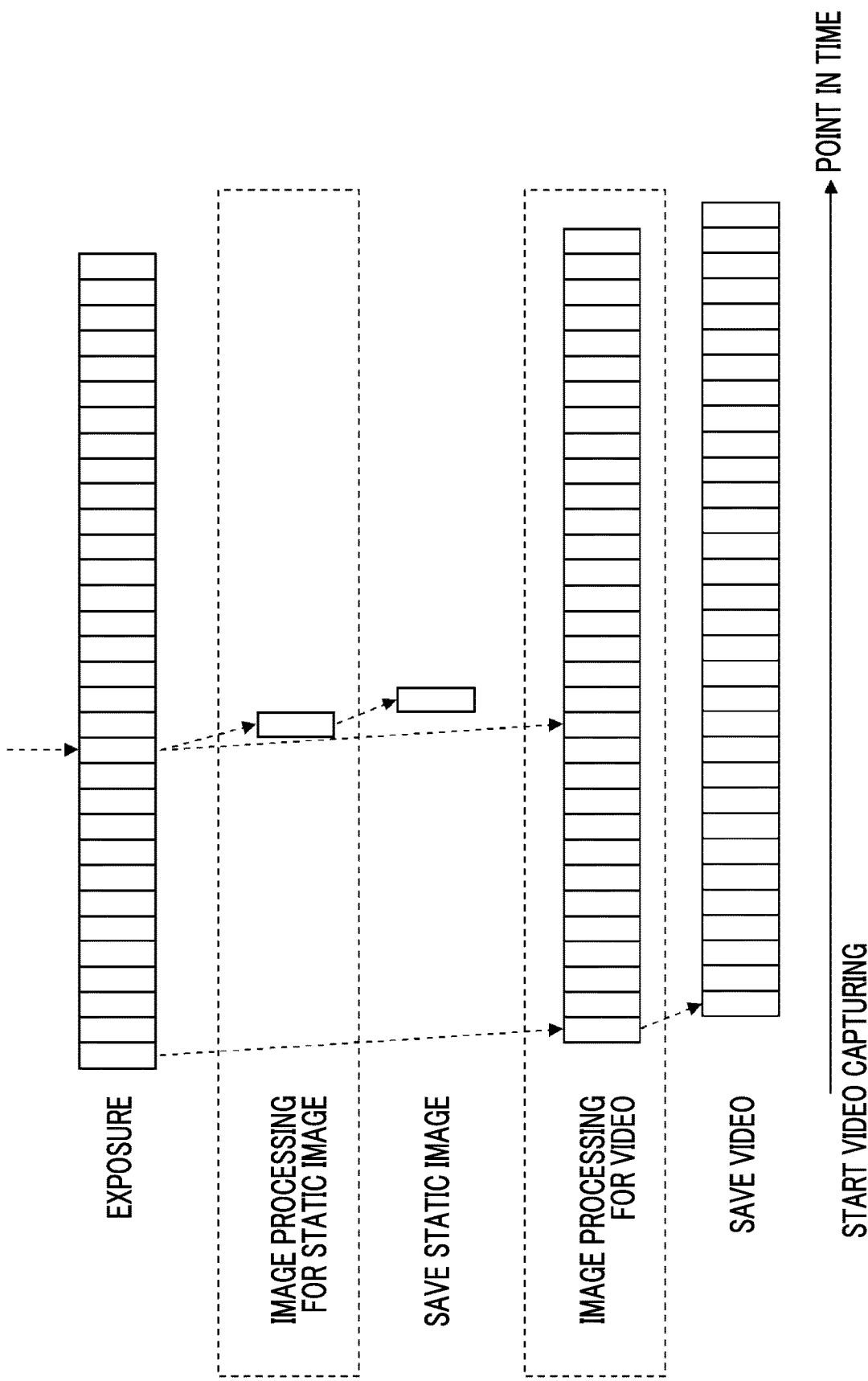
FIG. 5 is a diagram showing a state where the video and the static image are processed in parallel.

Regarding the imaging and the storing of the video file, the static image file, and the additional information described above, it is preferable that the video file generation section 240B and the static image file generation section 240D are constituted of at least partially independent circuitry and at least a part of generation processing of the static image file (first static image file) is performed independently of generation processing of the video file (refer to FIG. 5). A rectangle shown by a solid line in FIG. 5 indicates processing for one frame. It is possible to reduce the processing load with such parallel processing.

<Extraction of Static Image>

As described below, it is possible to extract the frame constituting the video as the static image in the camera system 10.

<Display of Static Image by Designation of Video File>

Figure 6:
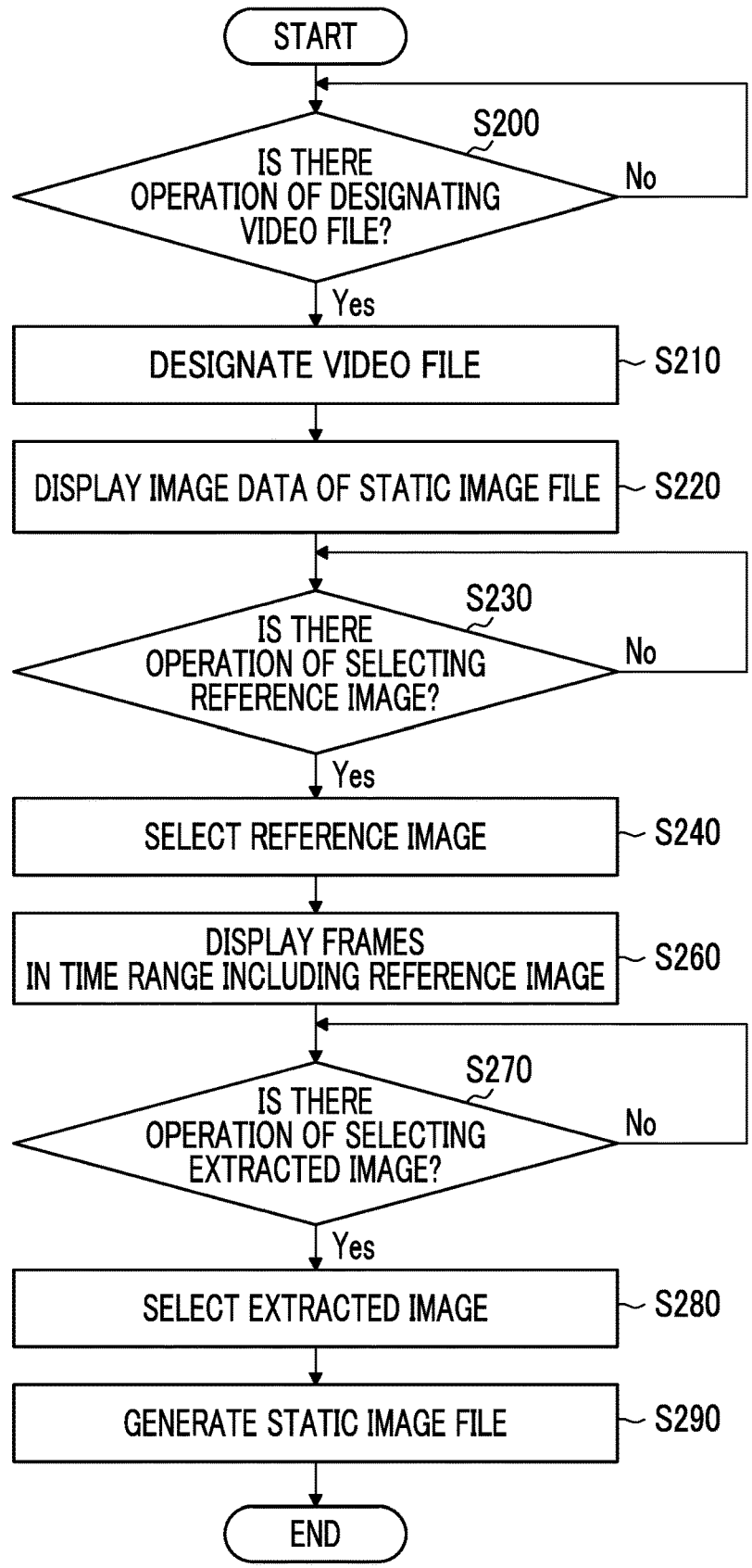
FIG. 6 is a flowchart showing static image extraction processing.

FIG. 6 is a flowchart showing static image extraction processing. The video file designation section 240C (video file designation section) determines whether or not there is an operation of designating the video file (Step S200: video file designation step). For example, in a case where there is an instruction input from the user through the operation section 250, it can be determined that "there is a designation operation". In a case where the determination in Step S200 is affirmative (YES), the video file designation section 240C designates the video file to be operated as a video file which is a static image extraction source (Step S210: video file designation step), and the display control section 240J (display control section) causes the monitor 270 (display device) to display the image data of the static image file (first static image file) stored for the designated video file with reference to the additional information (Step S220: display control step). The video which is the static image extraction source may be a video whose image quality is improved by replacing the frame described above. In a case where the static image file is in the RAW image format, the display control section 240J (display control section) may cause the monitor 270 (display device) to display the static image (JPEG or the like) for simply displaying the RAW image generated at the same time as the RAW image.

Figure 7:
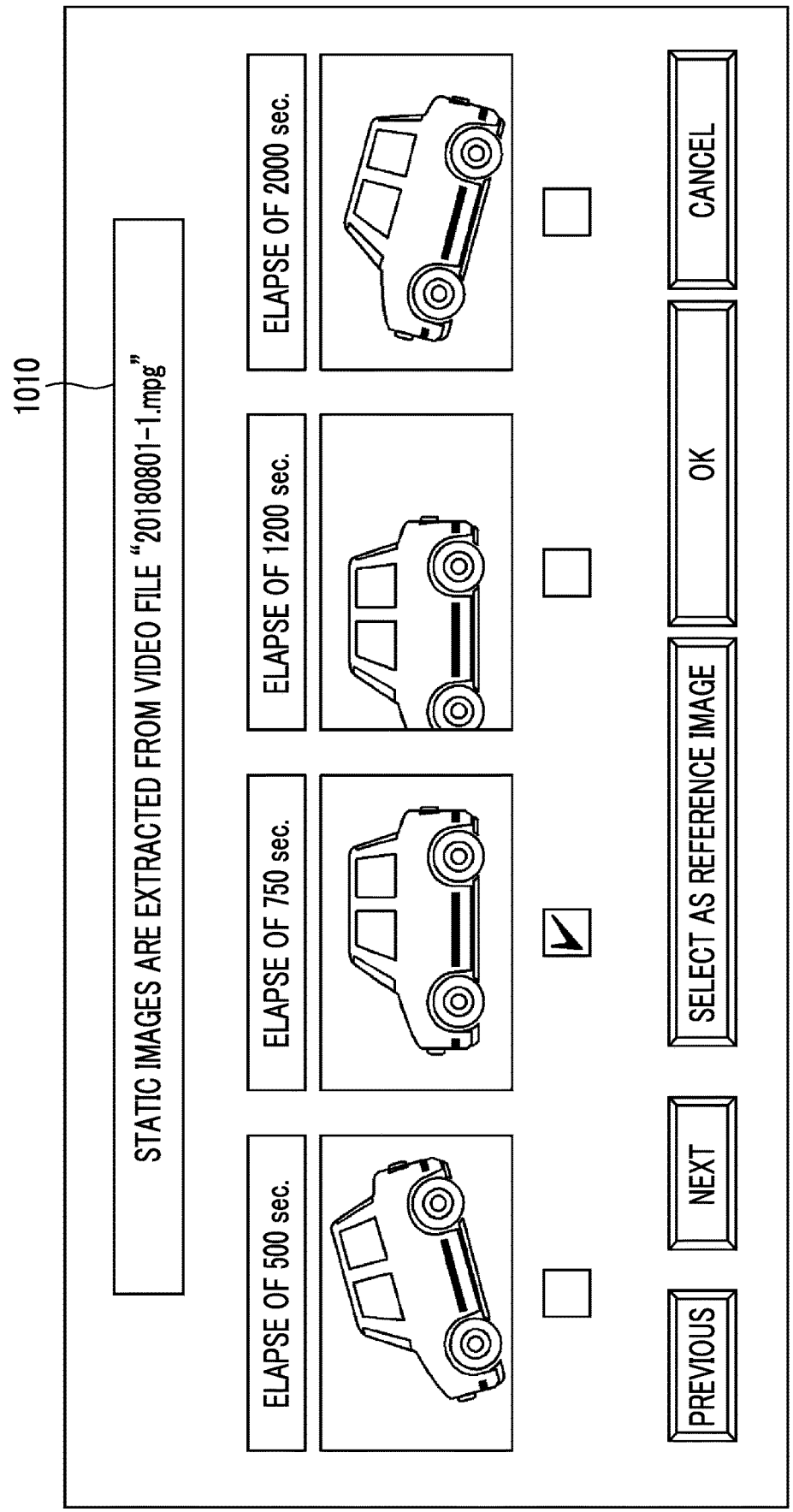
FIG. 7 is a diagram showing a state where a reference image is selected.

FIG. 7 is a diagram showing a display example of image data on the monitor 270. In the example of FIG. 7, elapsed times from the start of video capturing to the acquisition of the static image are displayed for four pieces of image data.

The display control section 240J can obtain the elapsed time based on the additional information (information indicating the position of the static image frame (first frame) in the video file). In a case where the image data is displayed, the display control section 240J superimposes and displays information indicating that the static image file (first static image file) is extracted from the plurality of frames constituting the video file on the image data. In the example of FIG. 7, a message 1010 of "static images are extracted from a video file "20180801-1.mpg" (file name of video file)" is superimposed and displayed on the image data. The static image extraction section 240H (static image extraction section) determines whether a displayed reference image may be extracted as the static image. Specifically, in a case where the user selects the displayed reference image and operates an "OK" button in FIG. 7 in a case where the displayed image data includes a desired image, the static image extraction section 240H determines that "the displayed reference image may be extracted as the static image" and the following processing is canceled to extract the image as the static image (print, save in another folder, and the like). On the other hand, in a case where "there is a reference image close to the desired image, but an imaging timing is slightly off" (in a case where the user is dissatisfied with the reference image), preceding and following frames including the frame of the static image file from the video file are displayed as shown below and the user selects the desired frame from among the displayed frames. Therefore, it is possible to extract a static image at a timing different from the reference image from the video. The example of FIG. 7 describes a case where the user considers that "the frames with elapsed times of 500 seconds, 1200 seconds, and 2000 seconds are not good-looking because a direction of the subject is tilted or a part of the subject is not shown, and thus a frame with an elapsed time of 750 seconds is set as the reference image and the best frame is searched for near the elapsed time of 750 seconds".

<Selection of Reference Image>

The image selection section 240G determines whether or not the operation of selecting the reference image from the image data of the displayed static image file is received (Step S230: reference image selection step) and selects the reference image in response to the received operation (Step S240: reference image selection step). For example, in a case where there is the instruction input from the user through the operation section 250 (in the example of FIG. 7, a case where an image is selected and a "select as reference image" button is operated), it can be determined that "operation is received".

<Display of Static Image Extracting Frames>

Figure 8:
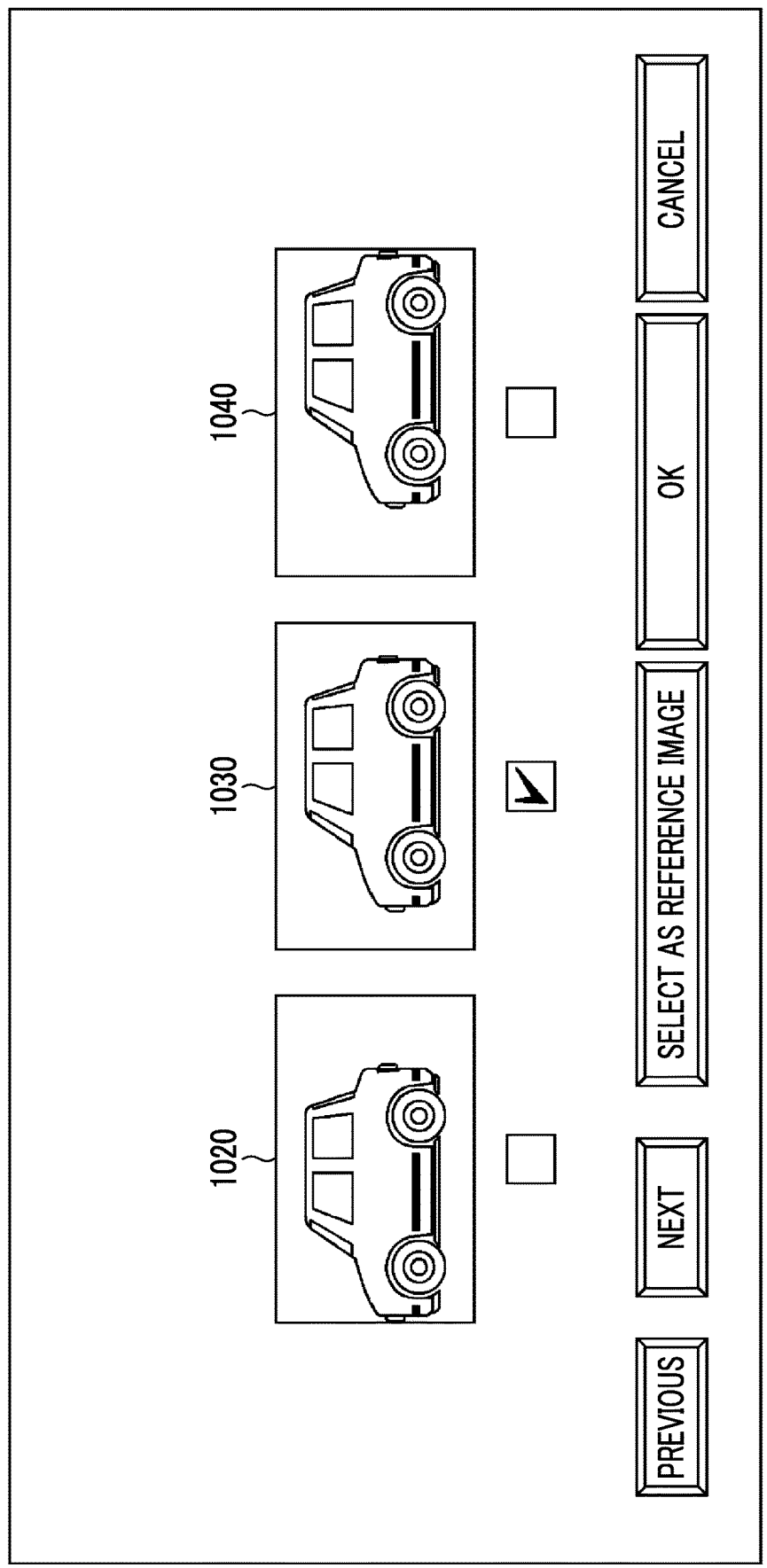
FIG. 8 is a diagram showing a state where an image in a time range including the reference image is displayed.

In a case where the reference image is selected in Step S240, the display control section 240J causes the monitor 270 (display device) to display the image data of the frames stored in the time range including the frame of the reference image among the plurality of frames constituting the video file (Step S260: display control step). In a case where the frame with the elapsed time of 750 seconds is selected as the reference image in the example of FIG. 7, the display control section 240J displays image data of the frame with elapsed times of 750±Δt (sec). For example, a reference image 1030 (frame number: N), and a frame 1020 (frame number: N−1) and a frame 1040 (frame number: N+1) preceding and following the reference image 1030 are displayed as shown in FIG. 8. The display may be an aspect of "including a frame of the reference image and a frame stored before the reference image" or an aspect of "including a frame of the reference image and a frame stored after the reference image". The range of the static image extracting frames to be displayed may be set according to designation by the user or may be set without depending on the designation by the user. The range of the frames to be displayed may be defined by time (for example, 0.5 seconds before and after the frame of the reference image) or may be specified by the number of frames (for example, 10 frames preceding and following the frame of the reference image).

<Selection of Static Image Extracting Image Data>

The image selection section 240G receives an operation of selecting static image extracting image data from the displayed image data in Step S260 (Step S270: image selection step) and selects the static image extracting image data in response to the received operation. (Step S280: image selection step). In Step S280, one or more pieces of image data can be selected, and a plurality of pieces of image data may be selected.

<Extraction of Static Image>

The static image extraction section 240H (static image extraction section) extracts a frame corresponding to the image data selected in Step S280 among the plurality of frames constituting the video as a second frame to generate a static image file (second static image file) (Step S290: static image extraction step). With such processing, the user can easily extract the static image from the video at a desired timing (which may be different from the static image storing timing at the time of video capturing). With the displaying of the images of the frames of the video file in the range determined by the reference image selected by the display control section 240J on the monitor 270 (display device), it is possible to reduce the load of image processing in a case where the images of the frames constituting the video file compressed between the frames are displayed on the monitor 270.

The video file is stored in a video format such as the MPEG format (for example, inter-frame compression is performed). Therefore, the static image extraction section 240H converts data of the second frame at the time of generating the static image file into a static image format (JPEG format or the like).

<Generation of Static Image File by Difference Processing>

Figure 9:
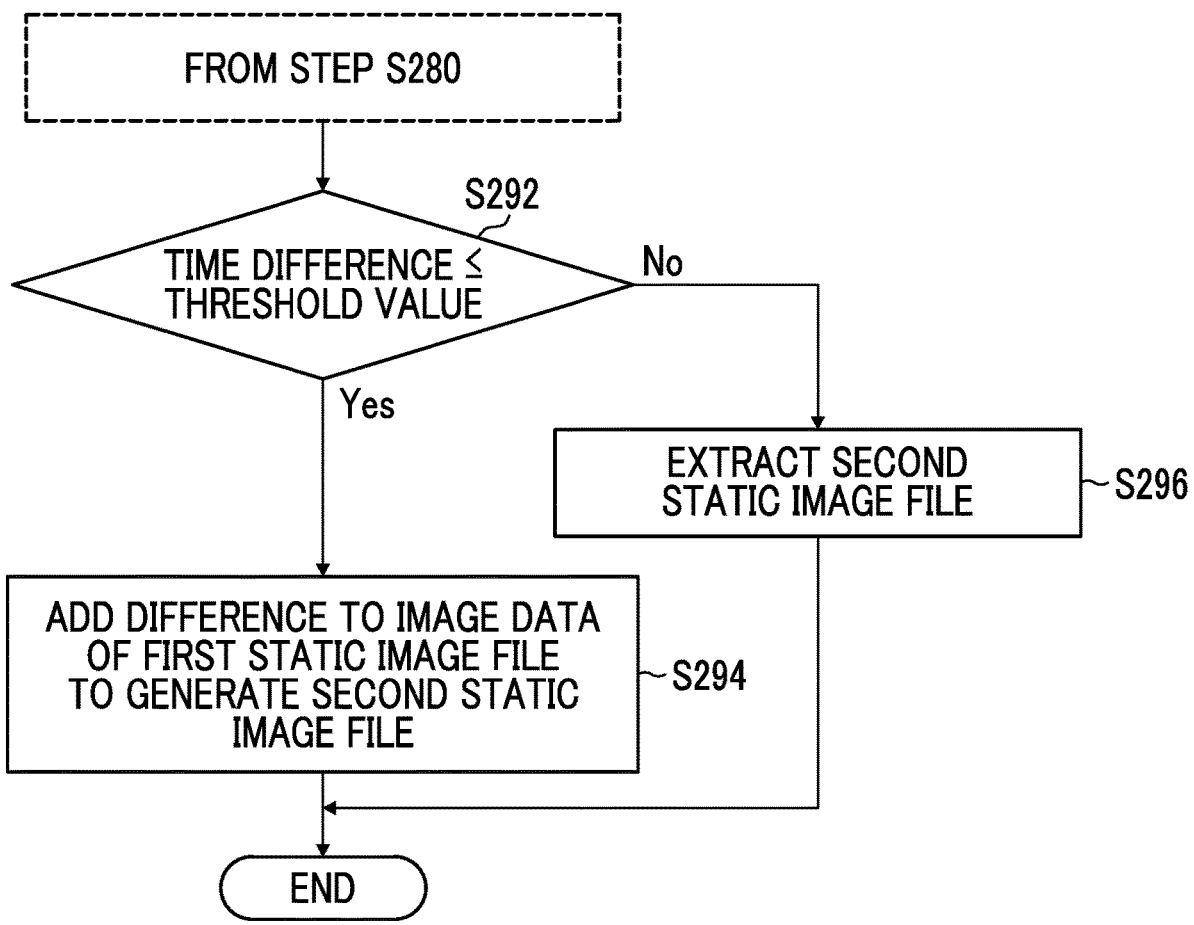
FIG. 9 is a flowchart showing processing of static image file generation by a difference.

In a case where the static image file (first static image file) is stored during the video capturing in the processing described above in FIG. 3, the static image file is not subjected to the video compression and may be subjected to the image processing described above in FIG. 5. Therefore, the static image file has higher image quality than that of each frame after the video compression. In a case where a frame is cut out from the imaged and stored video (extraction of static image), it is possible to improve the image quality of the frame at a desired timing with the image processing using the stored static image file. Specifically, in a state where the extracted image is selected in Step S280 of FIG. 6, the static image extraction section 240H determines whether or not a difference between a time at which the second frame is stored and a time at which the first frame is stored is equal to or less than a threshold value (Step S292 in FIG. 9: static image extraction step). In a case where the determination is affirmative (in a case where the time difference is equal to or less than the threshold value), the static image extraction section 240H adds a difference between the image data of the first frame and the second frame of the video file to the image data of the first static image file to generate the second static image file (Step S294: static image extraction step). On the other hand, in a case where the determination in Step S292 is negative, the static image extraction section 240H extracts the frame corresponding to the image data selected in Step S280 as the second frame to generate the second static image file (Step S296: static image extraction step). In a case where the processing based on the time difference as shown in FIG. 9 is performed, the image quality of the second static image file may deteriorate in a case where the difference in the storing time (storing timing) is large. Therefore, it is preferable to set the threshold value according to required image quality. The present invention is not limited to this aspect. In a case where the determination is affirmative (in a case where the time difference is equal to or less than the threshold value), the static image extraction section 240H may synthesize the static image file (first static image file) generated by the static image file generation section 240D and the image of the frame (the image of the second frame) constituting the video file generated by the video file generation section 240B by a known method to generate the second static image file. In a case where the static image file (first static image file) generated by the static image file generation section 240D is in the RAW image format, the static image file obtained by performing the static image processing (so-called "development processing") on the static image file in the RAW image format and the image of the frame (the image of the second frame) constituting the video file generated by the video file generation section 240B may be synthesized by a known method to generate the second static image file.

<Extraction of Static Image Based on Designation of Static Image File>

Figure 10:
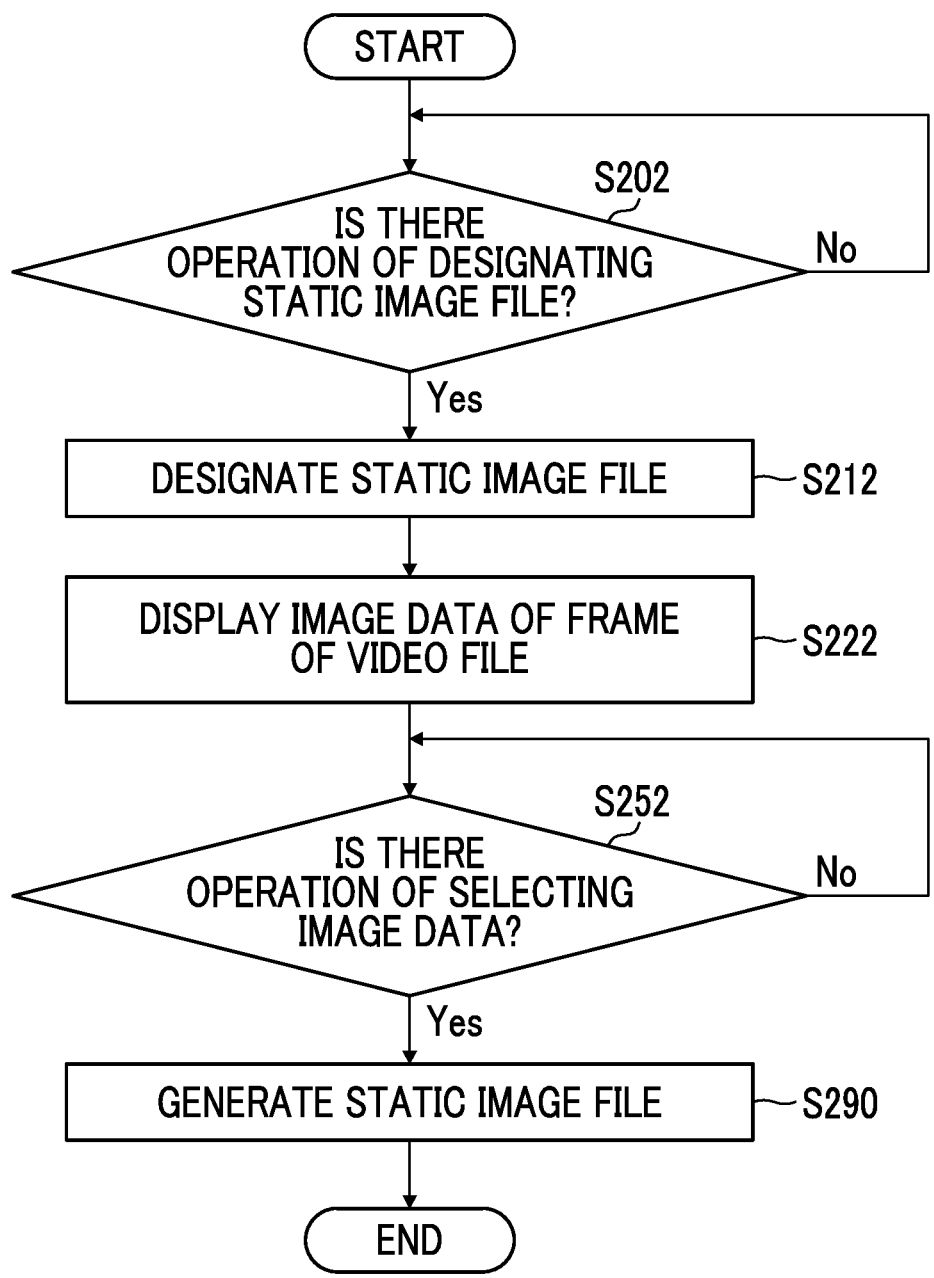
FIG. 10 is another flowchart showing the static image extraction processing.

In the aspect shown in FIG. 6, the video file is designated, the static image file (first static image file) is displayed by referring to the additional information about the designated video file, and the frame to be extracted as the static image is determined. However, it is also possible to determine an extracted frame with designation of the static image file as described below in the camera system 10 according to the first embodiment. Specifically, as shown in the flowchart of FIG. 10, the static image file designation section 240E (static image file designation section) determines whether or not an operation of designating the static image file is performed (Step S202: static image file designation step) and designates the static image file according to an operation content in a case where the operation is performed (Step S212: static image file designation step). In a case where the static image file (first static image file) is designated, the display control section 240J (display control section) specifies the video file with reference to the additional information and causes the monitor 270 (display device) to display the image data of the plurality of frames constituting the video file as in the example of FIG. 8 (Step S222: display control step). In Step S222, it is possible to display the image data of the frames stored in the time range including the frame corresponding to the designated static image file. In a case where the operation of selecting the image data to be extracted as the static image is performed (YES in Step S252: static image extraction step), the static image extraction section 240H extracts the frame of the video file corresponding to the selected image data to generate the second static image file (Step S290: static image extraction step).

<Another Aspect of Additional Information Storing>

In the first embodiment described above, the aspect in which the additional information is stored in the video file and the static image file (first static image file) is described. However, the storing of the additional information is not limited to such an aspect. The additional information may be stored in one of the video file and the static image file, or may be stored separately (in the storage device 260) from the video and the static image.

Second Embodiment

Although the camera system 10 which is a digital camera is described in the first embodiment, the configuration of the imaging device is not limited thereto. Another imaging device according to the present invention may be, for example, a built-in type or external type camera for PC, or a portable terminal device having an imaging function as described below.

Examples of the portable terminal device which is an embodiment of the imaging device according to the present invention include a portable phone or smartphone, a personal digital assistant (PDA), and a portable game machine. Hereinafter, a smartphone will be described as an example in detail with reference to drawings.

Figure 11:
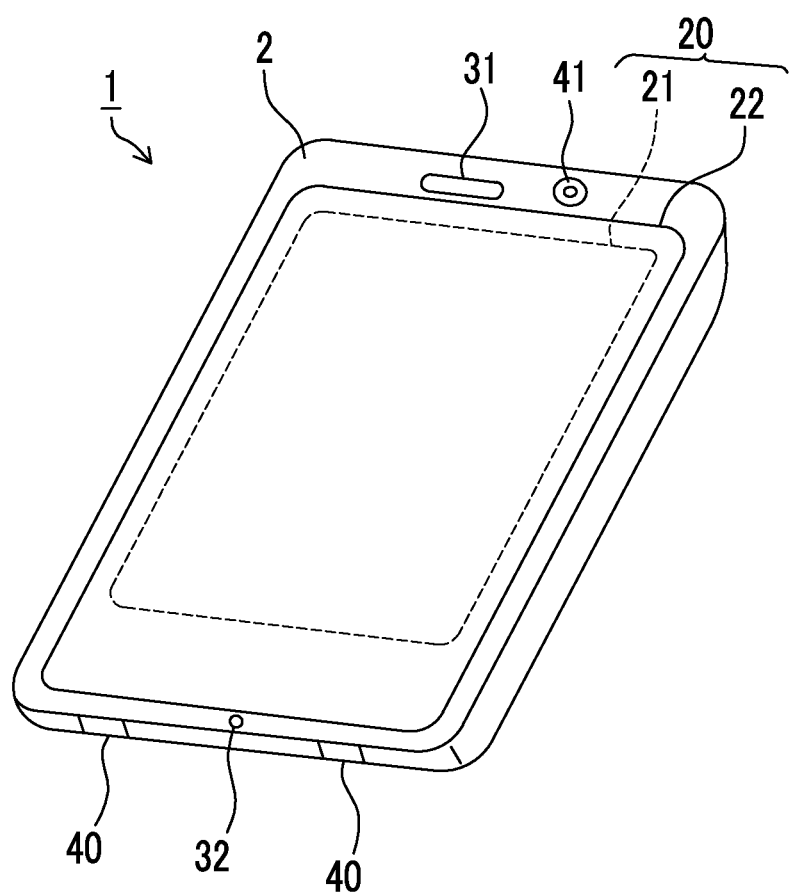
FIG. 11 is an external view of a smartphone according to a second embodiment.

FIG. 11 shows an appearance of a smartphone 1 (imaging device) which is an embodiment of the imaging device according to the present invention. The smartphone 1 shown in FIG. 11 has a flat housing 2 and comprises a display and input section 20 in which a display panel 21 (display device) as a display section and an operation panel 22 (operation section) as an input section are integrated on one surface of the housing 2. The housing 2 comprises a speaker 31, a microphone 32, an operation section 40 (operation section), and a camera section 41 (video capturing section, video file generation section, video file designation section, static image file generation section, static image file designation section, event detection section, image selection section, static image extraction section, storage section, display control section, and lens driving control section). A configuration of the housing 2 is not limited thereto. For example, a configuration in which the display section and the input section are independent may be employed, or a configuration having a folding structure or a slide mechanism may be employed.

Figure 12:
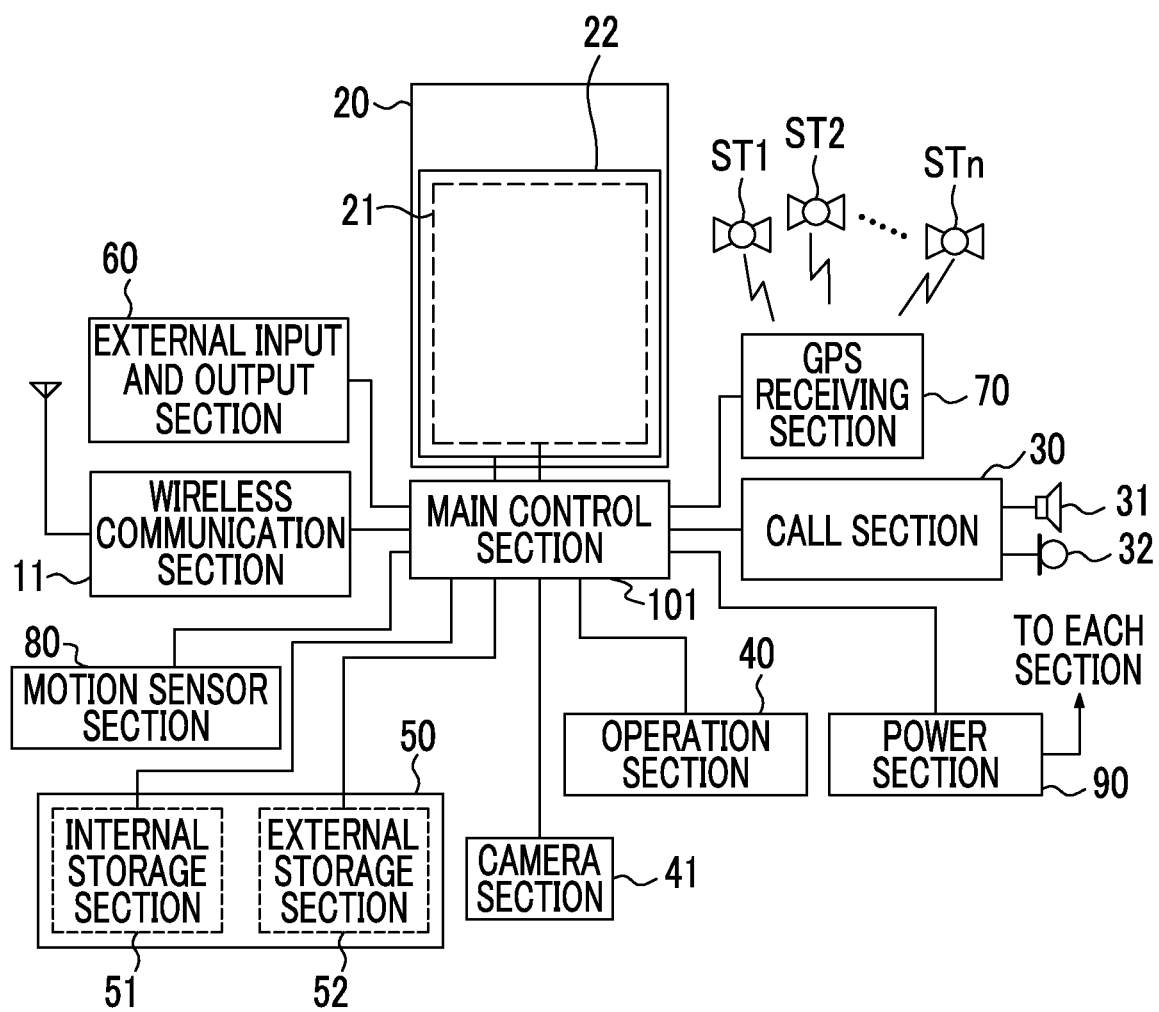
FIG. 12 is a block diagram showing a configuration of the smartphone according to the second embodiment.

FIG. 12 is a block diagram showing a configuration of the smartphone 1 shown in FIG. 11. As shown in FIG. 12, a wireless communication section 11, a display and input section 20, a call section 30, an operation section 40, a camera section 41, a storage section 50, an external input and output section 60, a GPS receiving section 70 (global positioning system: GPS), a motion sensor section 80, a power section 90, and a main control section 101 (video capturing section, video file generation section, video file designation section, static image file generation section, static image file designation section, event detection section, image selection section, static image extraction section, storage section, display control section, and lens driving control section) are provided as main components of the smartphone 1. A wireless communication function for performing mobile wireless communication through a base station device and a mobile communication network is provided as a main function of the smartphone 1.

The wireless communication section 11 performs wireless communication with the base station device accommodated in the mobile communication network in response to an instruction from the main control section 101. Using such wireless communication, various pieces of file data such as voice data and image data, e-mail data, and the like are transmitted and received, and Web data, streaming data, and the like are received.

The display and input section 20 is a so-called touch panel in which an image (static image and/or video image), character information, or the like is displayed to visually transmit information to the user and a user operation on the displayed information is detected under control of the main control section 101, and comprises the display panel 21 and the operation panel 22.

The display panel 21 uses a liquid crystal display (LCD), an organic electro-luminescence display (OELD), or the like as the display device. The operation panel 22 is a device that is placed such that an image displayed on a display surface of the display panel 21 is visually recognizable and detects one or a plurality of coordinates operated by a finger or a stylus of the user. In a case where such a device is operated by the finger or the stylus of the user, a detection signal generated due to the operation is output to the main control section 101. Next, the main control section 101 detects an operation position (coordinates) on the display panel 21 based on the received detection signal.

As shown in FIG. 11, although the display panel 21 and the operation panel 22 of the smartphone 1 exemplified as an embodiment of the imaging device according to the present invention integrally constitute the display and input section 20, the operation panel 22 is disposed so as to completely cover the display panel 21. In a case where such a disposition is employed, the operation panel 22 may comprise a function of detecting the user operation even in a region outside the display panel 21. In other words, the operation panel 22 may comprise a detection region (hereinafter referred to as display region) for an overlapping portion that overlaps the display panel 21 and a detection region (hereinafter referred to as non-display region) for the other outer edge portion that does not overlap the display panel 21.

A size of the display region and a size of the display panel 21 may be perfectly matched, but the sizes are not necessarily matched. The operation panel 22 may comprise two sensitive regions of the outer edge portion and the other inner portion. Further, a width of the outer edge portion is designed as appropriate according to a size of the housing 2 or the like. Furthermore, examples of a position detection method employed in the operation panel 22 include a matrix switch method, a resistive film method, a surface acoustic wave method, an infrared method, an electromagnetic induction method, and an electrostatic capacitive method, and any method may be employed.

The call section 30 comprises the speaker 31 and the microphone 32. The call section 30 can convert a voice of the user input through the microphone 32 into voice data that can be processed by the main control section 101 and output the converted voice data to the main control section 101, and can decode the voice data received by the wireless communication section 11 or the external input and output section 60 and output the decoded voice data from the speaker 31. Further, as shown in FIG. 11, it is possible to mount the speaker 31 on the same surface as a surface on which the display and input section 20 is provided, and to mount the microphone 32 on a side surface of the housing 2, for example.

The operation section 40 is a hardware key using a key switch or the like and receives the instruction from the user. For example, as shown in FIG. 11, the operation section 40 is a push button type switch that is mounted on the side surface of the housing 2 of the smartphone 1, is turned on in a case of being pressed with a finger or the like, and is turned off by restoring force of a spring or the like in a case where the finger is released.

The storage section 50 stores a control program or control data of the main control section 101, application software, address data in which a name, a telephone number, and the like of a communication partner are associated, data of transmitted and received e-mails, Web data downloaded by Web browsing, or downloaded content data, and temporarily stores streaming data or the like. The storage section 50 is constituted of an internal storage section 51 built into the smartphone and an external storage section 52 having an attachable and detachable external memory slot. Each of the internal storage section 51 and the external storage section 52 constituting the storage section 50 is formed by using a storing medium such as a flash memory type, a hard disk type, a multimedia card micro type, a card type memory (for example, MicroSD (registered trademark) memory or the like), a random access memory (RAM), or a read only memory (ROM).

The external input and output section 60 serves as an interface with all external devices connected to the smartphone 1, and is for directly or indirectly connecting to another external device by communication or the like (for example, universal serial bus (USB), IEEE1394, or the like) or a network (for example, Internet, wireless LAN, Bluetooth (registered trademark), radio frequency identification (RFID), infrared communication (infrared data association: IrDA) (registered trademark), ultra wideband (UWB) (registered trademark), ZigBee (registered trademark), or the like).

Examples of the external device connected to the smartphone 1 include a wired/wireless headset, a wired/wireless external charger, a wired/wireless data port, a memory card (SIM) or a subscriber identity module (SIM)/user identity module (UIM) card connected through a card socket, external audio and video devices connected through audio and video input and output (I/O) terminals, wirelessly connected external audio and video devices, a wired/wirelessly connected smartphone, a wired/wirelessly connected PDA, a wired/wirelessly connected personal computer, and an earphone. The external input and output section 60 can transmit the data transmitted from such an external device to each component inside the smartphone 1 or can transmit the data inside the smartphone 1 to the external device.

The GPS receiving section 70 receives GPS signals transmitted from GPS satellites ST1 to STn in response to the instruction from the main control section 101 and executes positioning calculation processing based on the plurality of received GPS signals to detect a position of the smartphone 1 (latitude, longitude, and altitude). In a case where position information can be acquired from the wireless communication section 11 or the external input and output section 60 (for example, wireless LAN), the GPS receiving section 70 can detect the position thereof using the position information.

The motion sensor section 80 comprises, for example, a triaxial acceleration sensor and detects a physical movement of the smartphone 1 in response to the instruction from the main control section 101. With the detection of the physical movement of the smartphone 1, a moving direction or acceleration of the smartphone 1 is detected. Such a detection result is output to the main control section 101. The power section 90 supplies electric power accumulated in a battery (not shown) to each section of the smartphone 1 in response to the instruction from the main control section 101.

The main control section 101 comprises a microprocessor and operates according to the control program or the control data stored in the storage section 50 to integrally control each section of the smartphone 1 including the camera section 41. The main control section 101 has a mobile communication control function for controlling each section of a communication system and an application processing function for performing voice communication or data communication through the wireless communication section 11.

The application processing function is realized by the main control section 101 operating according to the application software stored in the storage section 50. Examples of the application processing function include an infrared communication function that controls the external input and output section 60 to perform the data communication with a counterpart device, an e-mail function that transmits and receives e-mails, and a Web browsing function that browses a Web page.

The main control section 101 also has an image processing function such as displaying a video on the display and input section 20 based on the image data (data of static image or video image) such as received data or downloaded streaming data. The image processing function means a function of the main control section 101 decoding the image data, performing the image processing on such a decoding result, and displaying an image on the display and input section 20.

Further, the main control section 101 executes display control for the display panel 21 and operation detection control for detecting the user operation through the operation section 40 and the operation panel 22. With the execution of the display control, the main control section 101 displays an icon for activating the application software, a software key such as a scroll bar, or a window for creating an e-mail. The scroll bar is a software key for receiving an instruction to move a display portion of an image, such as a large image that does not fit in the display region of the display panel 21.

With the execution of the operation detection control, the main control section 101 detects the user operation through the operation section 40, receives an operation for an icon or an input of a character string in an input field of a window through the operation panel 22, or receives a request for scrolling the display image through the scroll bar.

Further, with the execution of the operation detection control, the main control section 101 determines whether the operation position for the operation panel 22 is the overlapping portion (display region) that overlaps the display panel 21 or the other outer edge portion (non-display region) that does not overlap the display panel 21, and has a touch panel control function for controlling the sensitive region of the operation panel 22 or a display position of the software key.

The main control section 101 can also detect a gesture operation for the operation panel 22 and execute a preset function according to the detected gesture operation. The gesture operation does not mean a conventional simple touch operation, but means an operation of drawing a trajectory with a finger or the like, designating a plurality of positions at the same time, or a combination of these to draw the trajectory about at least one from the plurality of positions.

The camera section 41 is a digital camera (imaging device) that performs the imaging electronically using the imaging element such as a complementary metal oxide semiconductor (CMOS) or a charge-coupled device (CCD). The camera section 41 can convert the image data (video, static image) obtained by imaging into compressed image data such as MPEG or joint photographic coding experts group (JPEG), and record the compressed image data in the storage section 50 or output the compressed image data through the external input and output section 60 or the wireless communication section 11, under the control of the main control section 101. The camera section 41 can perform division and combination of the videos, acquisition of the high-quality static image (RAW images or the like), frame replacement and process, and extraction of the static image from the video, under the control of the main control section 101. In the smartphone 1 shown in FIG. 11, the camera section 41 is mounted on the same surface as the display and input section 20, but the mounting position of the camera section 41 is not limited thereto. The camera section 41 may be mounted on a back surface of the display and input section 20, or a plurality of camera sections 41 may be mounted. In a case where the plurality of camera sections 41 are mounted, the camera sections 41 to be used for imaging may be switched to perform imaging independently, or the plurality of camera sections 41 may be used at the same time for imaging.

The camera section 41 can be used for various functions of the smartphone 1. For example, it is possible to display the image acquired by the camera section 41 on the display panel 21 or use the image of the camera section 41 as one of operation inputs of the operation panel 22. In a case where the GPS receiving section 70 detects the position, it is possible to detect the position with reference to the image from the camera section 41. Further, it is possible to determine an optical axis direction of the camera section 41 of the smartphone 1 or a current use environment without using the triaxial acceleration sensor or in combination with the triaxial acceleration sensor with reference to the image from the camera section 41. Of course, it is possible to use the image from the camera section 41 in the application software. In addition, the image data of the static image or the video can be recorded in the storage section 50 by adding the position information acquired by the GPS receiving section 70, voice information acquired by the microphone 32 (the voice information may be converted into text information by voice-text conversion by the main control section or the like), posture information acquired by the motion sensor section 80, and the like, or can be output through the external input and output section 60 or the wireless communication section 11.

In the smartphone 1 having the configuration described above, the processing of the imaging method according to the present invention (imaging and recording of the video, recording of the static image, and extraction of the static image, and the like) can be also performed similarly to the camera system 10 according to the first embodiment. Specifically, the processing executed by the image processing device 240 (each section shown in FIG. 2) in the first embodiment is executed by the camera section 41 and the main control section 101 in the smartphone 1, and thus it is possible to perform the processing of the imaging method according to the present invention. In addition, the functions of the operation section 250, the storage device 260, and the monitor 270 in the first embodiment can be respectively realized by the operation section 40, the storage section 50 and the operation panel 22, and the display panel 21 and the operation panel 22 in the smartphone 1. Accordingly, it is possible to obtain the same effect (capable of easily extracting the static image from the video) as that of the camera system 10 according to the first embodiment also in the smartphone 1 according to the second embodiment.

EXPLANATION OF REFERENCES

1: smartphone
2: housing
10: camera system
11: wireless communication section

20: display input section
21: display panel
22: operation panel
30: call section
31: speaker
32: microphone
40: operation section
41: camera section
50: storage section
51: internal storage section
52: external storage section
60: external input and output section
70: GPS receiving section
80: motion sensor section
90: power section
100: interchangeable lens
101: main control section
110: zoom lens
120: focus lens
130: stop
140: lens driving section
200: imaging device body
210: imaging element
220: AFE
230: A/D converter
240: image processing device
240A: video capturing section
240B: video file generation section
240C: video file designation section
240D: static image file generation section
240E: static image file designation section
240F: event detection section
240G: image selection section
240H: static image extraction section
240I: storage section
240J: display control section
240K: lens driving control section
242: ROM
250: operation section
260: storage device
270: monitor
1010: message
1020: frame
1030: reference image
1040: frame
L: optical axis
S100 to S296: each step of imaging method
ST1 to STn: GPS satellite

What is claimed is:

1. An imaging device comprising:
an image sensor that captures a video; and
a processor configured to
extract a first frame from a plurality of frames constituting the video captured by the image sensor to generate at least one first image file;
generate at least one video file constituted of a plurality of frames including the first frame from the video; and
store the at least one video file, the at least one first image file, and additional information indicating a position of the first frame in the at least one video file,
wherein the processor is further configured to
receive an operation of selecting a reference image from the at least one first image file, and
extract a second frame from the plurality of frames constituting the at least one video file to generate a second image file, based on the selected reference image.

2. The imaging device according to claim 1,
wherein the first image file is a first static image file, and the second image file is a second static image file.

3. The imaging device according to claim 2,
wherein the additional information includes information that identifies one of the first static image file and the video file in a case where the other is specified.

4. The imaging device according to claim 1,
wherein the additional information further includes a file name of the video file and a file name of the first image file.

5. The imaging device according to claim 1,
wherein the processor is further configured to store the additional information in the video file.

6. The imaging device according to claim 1,
wherein the processor is further configured to store the additional information in the first image file.

7. The imaging device according to claim 1,
wherein the processor is further configured to store the first image file and the video file in the same folder.

8. The imaging device according to claim 2,
wherein the processor is further configured to cause a display device to display image data of the first static image superimposing information indicating that the first static image file is extracted from the plurality of frames constituting the video file on the image data.

9. The imaging device according to claim 2,
wherein the processor is further configured to
cause a display device to display image data of frames stored in a time range including a frame of the reference image from the plurality of frames constituting the video file,
receive the operation of selecting static image extracting image data from the displayed image data, and
extract the frame corresponding to the selected static image extracting image data among the plurality of frames as the second frame to generate the second static image file.

10. The imaging device according to claim 2,
wherein the image data of the first static image file has a higher image quality than image data of the plurality of frames constituting the video file, and
the processor is further configured to use the first static image file to generate the second static image file in a case where a difference between a time at which the second frame is stored and a time at which the first frame is stored is equal to or less than a threshold value.

11. The imaging device according to claim 1,
wherein the processor is further configured to add a difference between image data of the first frame and the second frame of the video file to the image data of the first image file to generate the second image file.

12. The imaging device according to claim 2,
wherein the processor is further configured to
designate the first static image file, and
cause a display device to display image data of a plurality of frames constituting the video file with reference to the additional information in a case where the first static image file is designated.

13. The imaging device according to claim 12,
wherein the processor is further configured to
receive an operation of selecting one or more pieces of image data from the displayed image data, and
extract a frame of the at least one video file corresponding to the selected image data, to generate a static image file.

14. The imaging device according to claim 1,
wherein the processor is further configured to store the at least one first image file in response to an input from an outside.

15. The imaging device according to claim 1:
wherein the processor is further configured to
detect a frame in which an event occurs from the plurality of frames constituting the video,
generate the first image file according to the detection.

16. The imaging device according to claim 2,
wherein the processor is further configured to generate the first static image file by a circuitry that is at least partially independent of a circuitry that generates the video file.

17. The imaging device according to claim 2,
wherein the image data of the first static image file has a higher image quality than image data of the plurality of frames constituting the video file.

18. The imaging device according to claim 3,
wherein the image data of the first static image file has a higher image quality than image data of the plurality of frames constituting the video file.

19. An imaging method comprising:
capturing a video;
extracting a first frame from a plurality of frames constituting the captured video to generate at least one first image file;
generating at least one video file constituted of a plurality of frames including the first frame from the video;
storing the at least one video file, the at least one first image file, and additional information indicating a position of the first frame in the at least one video file;
receiving an operation of selecting a reference image from the at least one first image file; and
extracting a second frame from the plurality of frames constituting a plurality of the video files to generate a second image file, based on the selected reference image.

20. A non-transitory computer readable medium for storing a program causing a computer to execute the imaging method according to claim 19.

* * * * *